United States Patent [19]

Ozaki et al.

[11] Patent Number: 5,073,593

[45] Date of Patent: Dec. 17, 1991

[54] METHOD FOR MAKING MICROEMULSIONS OF ORGANOPOLYSILOXANES CONTAINING CYCLOHEXYLAMINO GROUPS

[75] Inventors: Masaru Ozaki, Ichihara; Isao Ona, Chiba, both of Japan

[73] Assignee: Dow Corning Toray Silicone Company, LTD., Tokyo, Japan

[21] Appl. No.: 537,545

[22] Filed: Jun. 13, 1990

[30] Foreign Application Priority Data

Jun. 19, 1989 [JP] Japan .................................. 1-156082

[51] Int. Cl.$^5$ ................................................ C08K 5/05
[52] U.S. Cl. ..................... 524/767; 524/838; 524/801
[58] Field of Search .................... 524/838, 801, 767

[56] References Cited

U.S. PATENT DOCUMENTS

| | | | |
|---|---|---|---|
| 3,619,281 | 11/1971 | Kroning et al. | 524/838 |
| 4,324,716 | 4/1982 | Reischl et al. | 524/767 |
| 4,535,109 | 8/1985 | Kondo et al. | 524/838 |
| 4,620,878 | 11/1986 | Gee | 106/287.15 |
| 4,935,464 | 6/1990 | Ona et al. | 524/838 |

*Primary Examiner*—Paul R. Michl
*Assistant Examiner*—Karen A. Hellender
*Attorney, Agent, or Firm*—Sharon K. Severance

[57] ABSTRACT

According to this invention, a microemulsion of an organopolysiloxane containing cyclohexylamino groups is prepared as follows: component (A), an organopolysiloxane containing cyclohexylamino groups and component (B), a nonionic surfactant and component (C), ethylene glycol or propylene glycol are blended. Formic acid or acetic acid, component (D) and water, component (E), are then added. The mixture is then stirred to form an emulsion precursor liquid, which is then dispersed in a prescribed amount of water. The microemulsion of the organopolysiloxane containing cyclohexylamino groups prepared using the method of this invention has an excellent shelf stability.

1 Claim, No Drawings

METHOD FOR MAKING MICROEMULSIONS OF ORGANOPOLYSILOXANES CONTAINING CYCLOHEXYLAMINO GROUPS

This invention concerns a method for making microemulsions comprising an organopolysiloxane containing cyclohexylamino groups. The method comprises the use of (A) an organopolysiloxane containing cyclohexylamino groups, (B) a nonionic surfactant, (C) ethylene glycol or propylene glycol (D) formic acid or acetic acid and (E) water.

BACKGROUND OF THE INVENTION

It is well known that when an organopolysiloxane is dispersed in water containing a surfactant, a microemulsion of an organopolysiloxane can be obtained. Further, when only a small amount of water is added to a mixture of organopolysiloxane and surfactant, a translucent (capable of transmitting light but causing sufficient diffusion to eliminate perception of distinct images) oily thick substance is formed. When the oily thick substance is dispersed in water, an organopolysiloxane emulsion with a small particle size (microemulsion) can be obtained (see U.S. Pat. No. 4,620,878 to Gee).

The aforementioned method can be used to easily obtain the microemulsion of an organopolysiloxane containing amino groups represented by Si-R-NH2 (where R is an alkylene group) or Si-R-NHR'NH2 (where R, R' are alkylene groups) in the molecule. However, for the microemulsion of organopolysiloxanes containing cyclohexylamino groups in the molecule, gel-like flakes may be easily formed in the manufacturing process, and the desired microemulsion cannot be obtained.

It is an object of this invention to provide a method for making microemulsions comprising an organopolysiloxane containing cyclohexylamino groups, wherein the microemulsion has a small particle size and excellent shelf stability.

THE INVENTION

This invention provides a method for making microemulsions comprising an organopolysiloxane containing cyclohexylamino groups, wherein the method for making the microemulsions comprises (I) forming a mixture from the following components:
  (A) 100 parts by weight of an organopolysiloxane containing cyclohexylamino groups and represented by the following formula:

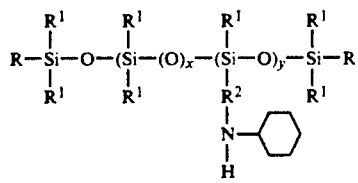

(1)

wherein each R is independently selected from a univalent hydrocarbon group, hydroxyl group, and alkoxy group; each $R^1$ is independently selected from a univalent hydrocarbon group; $R^2$ is selected from an alkylene group; x has a value of 50–2000; and y has a value of 2–100;

(B) 10–100 parts by weight of a nonionic surfactant;
(C) 10–50 parts by weight of ethylene glycol or propylene glycol;

(II) adding to mixture (I)
  (D) 0.1–5 parts by weight of formic acid or acetic acid; and
  (E) water in an amount less than twice the amount of said component (B);

(III) stirring said mixture (II) to form a emulsion precursor liquid; and (IV) dispersing the liquid from (III) in 100–1500 parts by weight of water.

The organopolysiloxane containing cyclohexylamino groups and represented by the following formula:

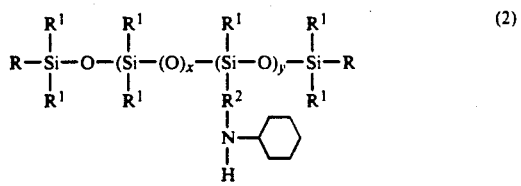

(2)

where each R is independently selected from a univalent hydrocarbon group, hydroxyl group, or alkoxy group; each $R^1$ is independently selected from a univalent hydrocarbon group; each $R^2$ is selected from an alkylene group; x has a value of 50–2000; and y has a value of 2–100.

R may be further exemplified by, but not limited to alkyl groups such as a methyl group, ethyl group, propyl group, butyl group, and others; alkenyl groups such as a vinyl group, propenyl group, butadienyl group, and others; cycloalkenyl group such as a cyclohexyl group and others; allyl groups such as a phenyl group and others; other univalent hydrocarbon groups; alkoxy groups such as a methoxy group, ethoxy group, propoxy group, and others; and a hydroxyl group.

$R^1$ may be exemplified by, but not limited to, alkyl groups such as a methyl group, ethyl group, propyl group, butyl group, and others; substituent alkyl groups such as a 2-phenylethyl group, 2-phenylpropyl group, 3,3,3-trifluoropropyl group, and others; alkenyl groups such as a vinyl group, propenyl group, butadienyl group, and others; cycloalkenyl groups such as a cyclohexyl group, and others; allyl groups and substituted allyl groups such as a phenyl group, tolyl group, xenyl group, naphthyl group, and others; and other univalent hydrocarbon groups.

$R^2$ may be exemplified by, but not limited to, alkylene groups such as an ethylene group, propylene group, butylene group, and others; x has a value of 50–2000; and y has a value of 2–2000. Preferably, $y/(x+y)$ should be 0.5–5.0 mole %.

The organopolysiloxane containing cyclohexylamino groups can be obtained from reaction between an organopolysiloxane containing halogenated alkyl groups and represented by the following formula:

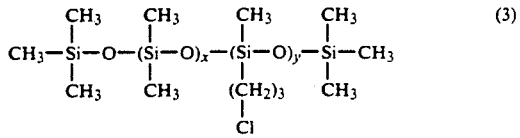

(3)

and cyclohexlamine wherein hydrochloric acid is removed as a by-product. The organopolysiloxane containing cyclohexylamino groups may also be prepared from the reaction between a dimethylpolysiloxane having hydroxyl groups at its molecular chain terminal, and an organoalkoxysilane represented by

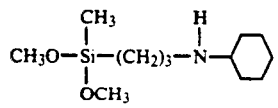

(4)

wherein methanol is removed as a by-product. Further, the organopolysiloxane containing cyclohexylamino groups can be produced from the polycondensation reaction between the hydrolysis condensation product of the organoalkoxysilane represented by

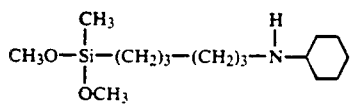

(5)

and octamethyltetrasiloxane in the presence of 200 ppm to 300 ppm of a potassium hydroxide catalyst.

The nonionic surfactant, component (B), used in this invention is a necessary component needed to emulsify the organopolysiloxane, component (A). Examples of the nonionic surfactants that can be used include, but are not limited to, polyoxyalkylene alkyl ether, polyoxyalkylene alkyl phenol ether, polyoxyalkylene alkyl ester, polypropylene glycol, diethylene glycol, and others. Among these, polyoxyalkylene alkyl ether and polyoxyalkyl phenol ether are preferred. Preferably, the HLB value of the nonionic surfactant should be 8-17. The nonionic surfactants useful in the instant invention are usually used as a combination of 2-3 different types of nonionic surfactants, however it is feasible to use them independently. For 100 parts by weight of component (A), the amount of the nonionic surfactant, component (B), used should be 10-100 parts by weight, preferably 15-50 parts by weight.

Ethylene glycol or propylene glycol, component (C), is a necessary component needed to realize the purpose of this invention. The ethylene glycol or propylene glycol can reduce the viscosity when the organopolysiloxane, (A) and the nonionic surfactant, (B) are mixed. At the same time, ethylene glycol or propylene glycol can prevent the gelation of component (A). For 100 parts by weight of component (A), the amount of the ethylene glycol or propylene glycol, component (C), used should be 10-50 parts by weight, preferably 15-30 parts by weight.

According to this invention, said components (A), (B), and (C) are mixed to form a mixture. There is no special limitation on the method for forming the mixture as long as the various components can be blended uniformly with each other. According to this invention, after said mixture of components (A), (B) and (C) is formed, it is added with 0.1-5 parts by weight of formic acid or acetic acid, component (D), and water, component (E), in an amount less than twice the amount of component (B). The mixture is stirred to form a precursor liquid of an organopolysiloxane emulsion containing cyclohexylamino groups. The formic acid or acetic acid used in this case is a necessary component for maintaining the stability and improving the transparency of the emulsion comprised of an organopolysiloxane containing cyclohexylamino groups prepared using the method of the invention. The amount of the water added should not be larger than twice the amount of component (B). If the amount of water added is larger than twice the amount of component (B), the particle size of the organopolysiloxane containing cyclohexylamino groups in the emulsion becomes too large.

According to this invention, the precursor liquid of the organopolysiloxane containing cyclohexylamino groups, obtained above, is dispersed in 100-1500 parts by weight of water to form an emulsion. Several schemes may be used for dispersing the precursor liquid in water, such as the method in which a prescribed amount of water is added to the precursor liquid and the mixture is uniformly stirred; the method in which the precursor liquid is added dropwise into a prescribed amount of water and the mixture is stirred; and in particular, the following method: first, about one half the prescribed amount of water is added into the precursor liquid; after the mixture is stirred to become homogeneous, the remaining water is added and stirred in the same way to form a homogeneous mixture.

The microemulsion obtained using the method of this invention may additionally include various conventional additives, known as emulsion modifiers, as long as the purpose of the invention is not harmed. These additives may be exemplified by, but not limited to, an organosilane containing an aminoalkyl group, an organosilane containing an epoxy group, an organosilane containing a mercaptopropyl group, and other organosilanes; various preservatives and antifungal agents for emulsions; as well as surfactants such as octyltrimethylammonium hydroxide, dodecyltrimethylammonium hydroxide, hexadecyltrimethylammonium hydroxide, octyldimethylbenzylammonium hydroxide, decyldimethylammonium hydroxide, didodecyldimethylammonium hydroxide, dioctadecyldimethylammonium hydroxide, beef-tallow trimethylammonium hydroxide, coconut-oil trimethylammonium hydroxide, and other quaternary ammonium hydroxides and their salts, as well as other cationic surfactants.

For the microemulsion of the organopolysiloxane containing cyclohexylamino groups obtained above, the particles of the organopolysiloxane containing cyclohexylamino groups in the emulsion have a very small average particle size, usually smaller than 150 nanometers, and a high shelf stability. The emulsion can be used as a fiber treating agent, such as an oil for treating polyacrylnitrile yarns, rayon yarns, carbon fiber yarns, and others, as well as softness modifiers and texture modifiers for various fabrics and fibers.

In the following, this invention will be explained with reference to application examples. In these application examples, "parts" refers to "parts by weight," and viscosity is the value measured at 25° C.

EXAMPLE 1

The following components were added to a 1500-cc beaker: Component (A): 75 parts of an organopolysiloxane containing cyclohexylamino groups which has a viscosity of 1200 cSt and is represented by the following formula:

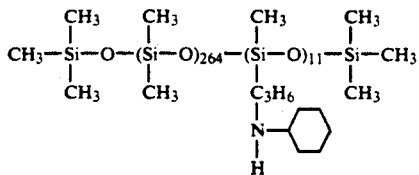

Component (B): 10 parts of a nonionic surfactant having an HLB value of 10.5 and represented by the formula $$C_{12-14}H_{25-29}O(C_2H_4O)_6H$$

(Softanol 50, a product of Nippon Catalyst Chemical Industry Co., Ltd.) and 5 parts of a nonionic surfactant having an HLB value of 11.7 and represented by the formula $$C_{12}H_{25}O(C_2H_4O)_5H$$

(Tergitol TMN-6, product of the Union Carbide Co.); and Component (C): 15 parts of ethylene glycol. The mixture was stirred by a propeller-type stirrer at a rotating speed of 400 rpm for 10 minutes, forming a blend of organopolysiloxane, nonionic surfactant, and ethylene glycol. Subsequently, 1.5 parts of acetic acid, component (D), dissolved in 10 parts of water, component (E), were added. Stirring was performed for 15 minutes, forming the precursor liquid of the organopolysiloxane emulsion. The obtained precursor liquid was in the form of a transparent fluid (capable of transmitting light such that an object can be seen as if there was no intervening material). The precursor liquid was added dropwise to 200 parts of water. After stirring for 15 minutes, 183.5 parts of water were added dropwise, followed by 10 minutes of stirring to form the microemulsion of an organopolysiloxane containing cyclohexylamino groups.

The emulsion was measured for its optical transmissivity and average particle size of the emulsion. Further, the appearance was observed by the naked eye. The results are listed in Table I. In this case, the optical transmissivity of the sample was measured on a spectrometer 100-50 produced by Hitachi, Ltd., with a cell thickness of 1 cm and a wavelength of 580 nm. The particle size of the emulsion was measured on a particle-size measurement apparatus Coulter Model N4 produced by the Coulter Electronics Co.

For the purpose of comparison, an organopolysiloxane emulsion was prepared in the same way as above except that the ethylene glycol, component (C), and acetic acid, component (D), were not used. The mixture of said components (A) and (B) formed midway in the manufacturing process of the emulsion was in a gel form without fluidity. The properties of the obtained organopolysiloxane emulsion were measured in the same way as above. The results are listed in Table I as Comparative Example 1.

Further, as Comparative Example 2, an organopolysiloxane emulsion was prepared in the same way as above except that acetic acid, component (D), was not used. The properties of the obtained emulsion were measured in the same way as above. The results are also listed in Table I.

Subsequently, as Comparative Example 3, an organopolysiloxane emulsion was prepared in the same way as above except that acetic acid was not used during the formation of the emulsion. Following the formation of the emulsion, 1.5 parts by weight of acetic acid was added to the emulsion, followed by stirring for 15 minutes.

As Comparative Example 4, an organopolysiloxane emulsion was prepared in the same way as above except that ethylene glycol and acetic acid were not used during the formation of the emulsion. Following the formation of the emulsion 1.5 parts by weight of acetic acid was added to the emulsion, followed by stirring for 15 minutes.

The properties of the samples of these comparative examples were also measured, and the results are also listed in Table I.

TABLE 1

| Property | Example 1 | Comparative Examples 1 | 2 | 3 | 4 |
|---|---|---|---|---|---|
| Optical Transmissivity | 77.1 | 0 | 0 | 1.2 | 2.1 |
| Average Particle Size | 34 nm | 3100 nm | 3411 nm | 270 nm | 210 nm |
| Appearance | (a) | (b) | (c) | (d) | (e) |

(a) Light-blue transparent liquid
(b) Milk-like turbid liquid
(c) Milk-like turbid liquid
(d) Translucent liquid
(e) Translucent liquid

EXAMPLE 2

75 parts of component (A), an organopolysiloxane containing cyclohexylamino groups and with a viscosity of 1200 cSt used in Example 1, 20 parts of component (B), a nonionic surfactant represented by the formula $$C_{12}H_{25}O(C_2H_4O)_6H$$

and having an HLB value of 11.7 (Tergitol TMN-6, product of the Union Carbide Co.), and 15 parts of component (C), ethylene glycol were added to a 1500-cc beaker. The mixture was stirred for 10 minutes by a propeller-type stirrer at a rotating speed of 400 rpm, forming a blend of an organopolysiloxane containing cyclohexylamino groups, nonionic surfactant, and ethylene glycol. Subsequently, component (D), 1.1 parts of formic acid, and component (E), 10 parts of water, were added to the blend, followed by stirring for 15 minutes, forming the precursor liquid of the organopolysiloxane emulsion. The obtained precursor liquid was in the form of a transparent liquid. 200 parts of water were then added dropwise to the precursor liquid. After stirring for 15 minutes, 183.5 parts of water were added dropwise, followed by stirring for 10 minutes, forming a transparent microemulsion of an organopolysiloxane containing cyclohexylamino groups. The optical transmissivity and average particle size of the emulsion were measured, with the results listed in Table II.

Subsequently, 1400 parts of water were added to 100 parts of the obtained emulsion. The diluted emulsion was used to dip a piece of broad cloth (50×50 cm) made of 100% cotton, which was taken out and had its contraction percentage adjusted to 100% by a mangle roll. Then the cloth was hung to dry in the room at 25° C. The obtained emulsion-treated broad cloth had a good feel, indicating that said microemulsion of the organopolysiloxane containing cyclohexylamino groups is suitable for the treatment of cloth.

As Comparative Example 5, an organopolysiloxane emulsion was prepared in the same way as above except that instead of the formic acid, propionic acid was used. The properties of the obtained emulsion were measured in the same way as above, with results listed in Table II.

TABLE 2

| Property | Example 2 | Comparative Example 5 |
|---|---|---|
| Optical Transmissivity | 73.3 | 0.8 |
| Average Particle Size | 44 nm | 298 nm |
| Evaluation of cloth treated with emulsion | Soft finish, good feel, no stimulating odor | Not soft, poor feel, offensive odor |

EXAMPLE 3

The following components were added to a 1500-cc beaker: 75 parts of an organopolysiloxane containing cyclohexylamino groups with a viscosity of 22,000 cSt and represented by the following formula:

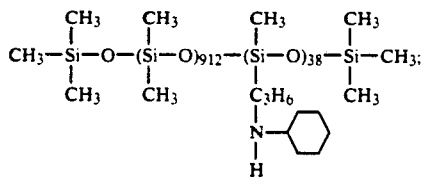

7.5 parts of the nonionic surfactant with an HLB of 10.5 used in Example 1, 2.5 parts of the nonionic surfactant with HLB 11.7 used in Example 1, 5 parts of a nonionic surfactant with an HLB of 14.1 and represented by the formula

$C_{12}H_{25}O(C_2H_4O)_5H$ (Tergitol TMN-10, product of the Union Carbide Co.), and 25 parts of propylene glycol. The mixture was stirred for 10 minutes by a propeller-type stirrer at a rotating speed of 400 rpm, forming a blend of organopolysiloxane, nonionic surfactant, and propylene glycol. After 20 parts of water were added to the blend and stirred for 10 minutes, 1.5 parts of acetic acid were added, followed by stirring for 15 minutes, forming the precursor liquid of the organopolysiloxane emulsion. The precursor liquid was in the form of a sticky transparent fluid. 200 parts of water were then added to the precursor liquid and the mixture was stirred for 15 minutes. Afterwards, 168.5 parts of water were added, followed by stirring for 15 minutes, forming the microemulsion of an organopolysiloxane containing cyclohexylamino groups. The properties and appearance of the obtained emulsion were measured in the same way as in Example 1, with the results listed in Table III.

As Comparative Example 6, an emulsion was prepared in the same way as above except that the propylene glycol and the acetic acid were not used. The mixture of components (A) and (B) formed midway in the manufacturing process of the emulsion was in the form of a translucent gel, making it virtually impossible to perform blending in a uniform way. The characteristics of the obtained emulsion were measured in the same way as in Example 1, with the results listed in Table 3.

TABLE 3

| Property | Example 3 | Comparative Example 6 |
|---|---|---|
| Optical Transmissivity | 93 | 0 |
| Average Particle Size | 28 nm | 3320 nm |
| Appearance | Light-blue, transparent liquid | Milk-like, turbid emulsion |

EXAMPLE 4

A microemulsion of an organopolysiloxane containing cyclohexylamino groups was prepared in the same way as in Example 1 except that instead of the 75 parts of organopolysiloxane containing cyclohexylamino groups with a viscosity of 1200 cSt used in Example 1, 75 parts of an organopolysiloxane containing cyclohexylamino groups with a viscosity of 1500 cSt and represented by the formula

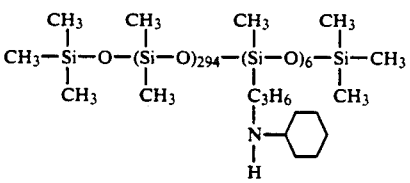

were used, and that instead of 15 parts of ethylene glycol, 25 parts of ethylene glycol were used in this case. The properties of the emulsion were measured in the same way as in Example 1. The results are as follows:

Optical transmissivity: 13.7%
Average particle size: 101 nm
Appearance: Whitish transparent liquid

EXAMPLE 5

The following components were added to a 1500-cc beaker: 75 parts of an organopolysiloxane containing cyclohexylamino groups with a viscosity of 23,300 cSt and represented by the formula

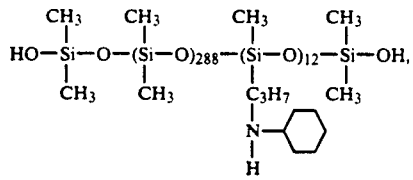

10 parts of the nonionic surfactant with an HLB value of 10.5 used in Example 1, 5 parts of the nonionic surfactant with an HLB value of 14.1 used in Example 3, and 25 parts of propylene glycol. The mixture was stirred for 10 minutes by a propeller-type stirrer at a rotating speed of 400 rpm. Subsequently, 10 parts of water were added and the mixture was stirred for 10 minutes. Afterwards, 1.5 parts of formic acid were added, followed by stirring for 10 minutes, forming the precursor liquid of an organopolysiloxane emulsion. 200 parts of water were then added to the precursor liquid, followed by stirring for 15 minutes. Subsequently, 174 parts of water were added, followed by stirring for 10 minutes, forming the microemulsion of an organopolysiloxane containing cyclohexylamino groups. The properties of the emulsion were measured in the same way as in Example 1, with the results as follow:
Optical transmissivity: 93.1%
Average particle size: 28 nm
Appearance: Light-blue transparent liquid

EXAMPLE 6

A microemulsion of an organopolysiloxane containing cyclohexylamino groups was prepared in the same was as in Example 5 except that instead of the organopolysiloxane with a viscosity of 23,300 cSt used in Example 5, an organopolysiloxane containing cyclohexylamino groups, with two terminals blocked by hydroxyl groups, represented by the formula

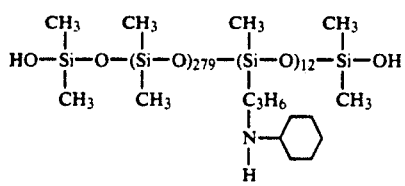

and with a viscosity of 1500 cSt, was used in this case. The properties of this emulsion were measured in the same way as in Example 1. The results are as follows:
Optical transmissivity: 76%
Average particle size: 49 nm
Appearance: Light-blue transparent liquid

EXAMPLE 7

A microemulsion of an organopolysiloxane containing cyclohexylamino groups was prepared in the same way as in Example 5 except that instead of the organopolysiloxane with a viscosity of 23,300 cSt used in Example 5, the organopolysiloxane with two terminals blocked by methoxy groups, having a viscosity of 1470 cSt, and represented by the formula

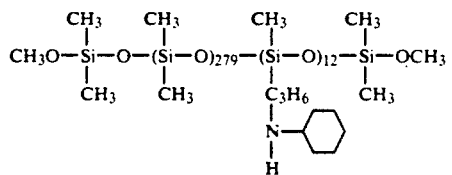

was used in this case. The properties of the obtained emulsion were measured in the same way as in Example 5. The results are as follows:

Optical transmissivity: 75.2%
Average particle size: 52 nm
Appearance: Light-blue transparent liquid Said emulsion was then added to a 250-cc mayonnaise jar. The jar was then kept at 50° C. for 20 days. The properties of the emulsion were than measured. In another scheme, the sample was left at 25° C. for 6 months before the properties were measured. In both cases, there was no change in the optical transmissivity and appearance of the sample.

What is claimed is:

1. A method for making microemulsions comprising an organopolysiloxane containing cyclohexylamino groups, wherein the method for making the microemulsions comprises
   (I) forming a mixture from the following components:
      (A) 100 parts by weight of an organopolysiloxane containing cyclohexylamino groups and represented by the following formula:

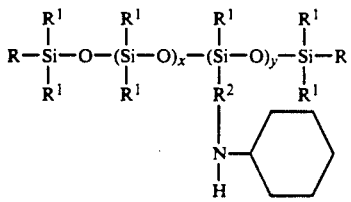

wherein each R is independently selected from a univalent hydrocarbon group, hydroxyl group, and alkoxy group; each $R^1$ is independently selected from a univalent hydrocarbon group; $R^2$ is selected from an alkylene group; x has a value of 50-2000; and y has a value of 2-100;
      (B) 10-100 parts by weight of a nonionic surfactant;
      (C) 10-50 parts by weight of ethylene glycol or propylene glycol;
   (II) adding to mixture (I)
      (D) 0.1-5 parts by weight of formic acid or acetic acid; and
      (E) water in an amount less than twice the amount of said component (B);
   (III) stirring said mixture (II) to form an emulsion precursor liquid; and
   (IV) dispersing the liquid from (III) in 100-1500 parts by weight of water.

* * * * *